(12) United States Patent
Billhartz et al.

(10) Patent No.: US 7,346,167 B2
(45) Date of Patent: *Mar. 18, 2008

(54) SECURE MOBILE AD-HOC NETWORK AND RELATED METHODS

(75) Inventors: Thomas Jay Billhartz, Melbourne, FL (US); Frank Joseph Fleming, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 895 days.

This patent is subject to a terminal disclaimer.

(21) Appl. No.: 10/143,145

(22) Filed: May 10, 2002

(65) Prior Publication Data

US 2003/0210787 A1 Nov. 13, 2003

(51) Int. Cl.
*H04L 9/00* (2006.01)

(52) U.S. Cl. .................. 380/270; 455/3.01; 709/227
(58) Field of Classification Search ............. 713/150, 713/153, 165, 171; 726/2–4, 26; 709/223–232; 380/228, 239, 270, 37, 277–286, 44, 28–30, 380/46, 4, 47, 255, 262, 247; 375/240.16, 375/240.22; 708/441, 250, 255; 710/50; 455/3.01, 456.6
See application file for complete search history.

(56) References Cited

U.S. PATENT DOCUMENTS

| | | | |
|---|---|---|---|
| 4,817,146 A * | 3/1989 | Szczutkowski et al. ..... | 380/261 |
| 5,239,584 A | 8/1993 | Hershey et al. ............. | 380/28 |
| 5,345,508 A | 9/1994 | Lynn et al. .................. | 380/46 |
| 5,412,654 A | 5/1995 | Perkins ........................ | 370/94 |
| 5,432,850 A | 7/1995 | Rothenberg .................. | 380/23 |
| 5,513,245 A | 4/1996 | Mizikovsky et al. ......... | 379/59 |
| 5,541,994 A * | 7/1996 | Tomko et al. ................ | 380/30 |
| 5,778,069 A | 7/1998 | Thomlinson et al. ......... | 380/25 |
| 5,832,228 A | 11/1998 | Holden et al. | |
| 5,872,847 A | 2/1999 | Boyle et al. .................. | 380/25 |

(Continued)

FOREIGN PATENT DOCUMENTS

WO 99/34548 7/1999

(Continued)

OTHER PUBLICATIONS

Raffo, Daniele: Security Schemes for the OLSR Protocol for Ad Hoc Networks; Sep. 15, 2005; PhD Thesis, University Paris, Chapter 4.*

(Continued)

*Primary Examiner*—Kim Vu
*Assistant Examiner*—Leynna Ha
(74) *Attorney, Agent, or Firm*—Allen, Dyer, Doppelt, Milbrath & Gilchrist, P.A.

(57) ABSTRACT

A mobile ad-hoc network may include a plurality of nodes including a source node and at least one adjacent node. The source node may include a wireless communications device for establishing a wireless communications link with the at least one adjacent node, a plain text source, and a seed generator for performing a one-way algorithm using a secret key for generating a seed. Furthermore, the source node may also include a key encryptor for receiving the seed and generating a key sequence based thereon, and a logic circuit for generating cipher text for transmission over the wireless communications link and based upon the key sequence and the plain text.

42 Claims, 4 Drawing Sheets

U.S. PATENT DOCUMENTS

| | | | | |
|---|---|---|---|---|
| 5,963,646 | A * | 10/1999 | Fielder et al. | 380/259 |
| 6,028,939 | A | 2/2000 | Yin | 380/49 |
| 6,065,120 | A * | 5/2000 | Laursen et al. | 726/5 |
| 6,148,405 | A * | 11/2000 | Liao et al. | 726/2 |
| 6,167,514 | A * | 12/2000 | Matsui et al. | 713/150 |
| 6,215,876 | B1 | 4/2001 | Gilley | 380/260 |
| 6,233,608 | B1 * | 5/2001 | Laursen et al. | 709/217 |
| 6,263,437 | B1 | 7/2001 | Liao et al. | 713/169 |
| 6,304,556 | B1 | 10/2001 | Haas | 370/254 |
| 6,307,938 | B1 * | 10/2001 | Matyas et al. | 380/44 |
| 6,438,666 | B2 | 8/2002 | Cassagnol et al. | 711/163 |
| 6,480,957 | B1 * | 11/2002 | Liao et al. | 713/170 |
| 6,668,324 | B1 * | 12/2003 | Mangold et al. | 713/189 |
| 6,697,490 | B1 | 2/2004 | Mizikovski et al. | 380/262 |
| 6,823,455 | B1 * | 11/2004 | Macy et al. | 713/176 |
| 6,895,234 | B1 * | 5/2005 | Laursen et al. | 455/403 |
| 6,931,128 | B2 * | 8/2005 | Roberts | 380/44 |
| 6,944,688 | B1 * | 9/2005 | Batcher | 710/55 |
| 6,987,853 | B2 * | 1/2006 | Uner | 380/44 |
| 7,039,190 | B1 * | 5/2006 | Engwer et al. | 380/270 |
| 7,194,760 | B2 * | 3/2007 | Nordman et al. | 726/5 |
| 7,277,404 | B2 * | 10/2007 | Tanzella et al. | 370/310 |
| 7,277,548 | B2 * | 10/2007 | Park et al. | 380/270 |
| 2003/0059052 | A1 | 3/2003 | Cheng | 380/274 |

FOREIGN PATENT DOCUMENTS

WO            00/35143          6/2000

OTHER PUBLICATIONS

Weinstein, Sydney: Wi-Fi Protected Access Encryption and Authentication; Jan. 2005; Faulkner Information Services, 1-5 pages.*

Lu, Hua: Replica Allocation and Data Update Strategies in Mobile Ad Hoc Networks; 2005; Univeristy of Guelph (Canada); Publication #AAT MR05785; 78 pages.*

Al-Shurman, Mohammad: Secure Routing with Key Pre-distribution Using MDS Codes in Mobile Ad Hoc Networks; 2006; The University of Alabama in Huntsville; Pulication #AAT 3227720; 107 pages.*

Hussein, Osam Hussein: Biological Based Routing Algorithm for Mobile Ad-hoc Networks; 2005; City University of New York; Publication #AAT 3159218, 84 pages.*

Stubblefield et al., *Using the Fluhrer, Mantin and Shamir Attack to Break WEP*, AT&T Labs Technical Report, TD-4ZCPZZ, Revision 2, Aug. 21, 2001.

Borisov et al., *Intercepting Mobile Communications: The insecurity of 802.11*, In MOBICOM 2001, Rome, Italy, Jul. 2001.

Smith et al., *Securing Distance-Vector Routing Protocols*, ISOC Symposium on Network and Distributed System Security, San Diego, CA, 1997, pp. 85-92.

Nguyen et al., *Security Routing Analysis for Mobile Ad Hoc Networks*, Department of Interdisciplinary Telecommunications, University of Colorado at Boulder, Spring 2000.

RSA Security Response to Weaknesses in Key Scheduling Algorithm of RC4, RSA Laboratories, Sep. 1, 2001, available at www.rsasecurity.com/rsalabs/technotes/wep.html.

Getgen, *Securing the Air: Don't Let Your Wireless LAN be a Moving Target*, IBM, Dec. 2001, available at www.-106.ibm.com/developerworks/library/wi-sec1/.

Mehta, *Wired Equivalency Privacy Vulnerability*, Apr. 4, 2001, available at www.rr.sans.org/wireless/equiv.php.

Ross, *Containing the Wireless LAN Security Risk*, Nov. 4, 2000, available at www.rr.sans.org/wireless/wireless_LAN.php.

*WEP Fix Using RC4 Fast Packet Keying*, RSA Laboratories, Dec. 17, 2001, available at www.rsasecurity.com/rsalabs/technotes/wep-fix.html.

Phifer, Fixed Wireless Technology-Better Than WEP, ISP Planet, Feb. 1, 2002, available at www.isp-planet.com/fixed_wir...technology/2002/better_than_wep.html.

Ying, *KeyHopping™-A Security Enhancement Scheme for IEE 802.11 WEP Standards*, NextComm, Inc., 2002.

"Applied Cryptography, Protocols, Algorithms and Source Code in C", Bruce Schneier, John Wiley & Sons, 1996, XP002322439, New York, US, ISBN: 0-471-11709-9.

"Handbook of Applied Cryptography", Menezes et al., CRC Press Series on Discrete Mathematics and its Applications, 1997, XP002322440, Boca Raton, FL, US ISBN: 0-8493-8523-7.

Murata Ichiro et al: Abstract of Japan; "*Radio Communication Speech Controller*"; Sep. 3, 1997;Publication No. 11-088949.

Lidong Zhou, et al.: "*Securing Ad Hoc Networks*"; Nov./Dec. 1999.

Scott Fluhrer et al: "*Weakness in the Key Scheduling Algorithm of RC4*"; SAC 2001, LNCS 2259, pp. 1-24.

* cited by examiner

SECURE MOBILE AD-HOC NETWORK AND RELATED METHODS

FIELD OF THE INVENTION

The present invention relates to the field of wireless networks, and, more particularly, to mobile ad-hoc networks and related methods.

BACKGROUND OF THE INVENTION

Wireless networks have experienced increased development in the past decade. One of the most rapidly developing areas is mobile ad-hoc networks. Physically, a mobile ad-hoc network includes a number of geographically-distributed, potentially mobile nodes sharing a common radio channel. Compared with other types of networks, such as cellular networks or satellite networks, the most distinctive feature of mobile ad-hoc networks is the lack of any fixed infrastructure. The network may be formed of mobile nodes only, and a network is created "on the fly" as the nodes come close enough to transmit with each other. The network does not depend on a particular node and dynamically adjusts as some nodes join or others leave the network.

Because of these unique characteristics, routing protocols for governing data flow within ad-hoc networks are required which can adapt to frequent topology changes. Two basic categories of ad-hoc routing protocols have emerged in recent years, namely reactive or "on-demand" protocols, and proactive or table-driven protocols. Reactive protocols collect routing information when a particular route is required to a destination in response to a route request. Examples of reactive protocols include ad-hoc on demand distance vector (AODV) routing, dynamic source routing (DSR), and the temporally ordered routing algorithm (TORA).

On the other hand, proactive routing protocols attempt to maintain consistent, up-to-date routing information from each node to every other node in the network. Such protocols typically require each node to maintain one or more tables to store routing information, and they respond to changes in network topology by propagating updates throughout the network to maintain a consistent view of the network. Examples of such proactive routing protocols include destination-sequenced distance-vector (DSDV) routing, which is disclosed in U.S. Pat. No. 5,412,654 to Perkins; the wireless routing protocol (WRP); and cluster-head gateway switch routing (CGSR). A hybrid protocol which uses both proactive and reactive approaches is the zone routing protocol (ZRP), which is disclosed in U.S. Pat. No. 6,304,556 to Haas.

One challenge to the advancement of ad-hoc network development is that of security. More particularly, since nodes in a mobile ad-hoc network all communicate wirelessly, there is a much greater risk of eavesdropping or data compromise by unauthorized users. Because of the early stage of development of ad-hoc networks and the numerous other challenges these networks present, the above routing protocols have heretofore primarily focused solely on the mechanics of data routing and not on security.

Some approaches are now being developed for providing more secure data transmissions within mobile ad-hoc networks. One such approach is outlined in a Capstone Proceeding paper by Nguyen et al. entitled "Security Routing Analysis for Mobile Ad Hoc Networks," Department of Interdisciplinary Telecommunications, University Of Colorado at Boulder, Spring 2000. In this paper, the authors suggest using the U.S. Data Encryption Standard (DES) for encrypting plain text messages. To authenticate the messages, digital signatures and keyed one-way hashing functions with windowed sequence numbers are proposed. More particularly, public-key encryption is used along with a one-way hash function to provide the digital signature. The sender uses the one-way hash function on the message and then encrypts the hash value with their private key. The message, along with the encrypted hash value, is sent to its destination. At the receiver, the hash value is also calculated based upon the message and is compared with the received hash value that was decrypted with the sender's public key. If they are the same, then the signature is authenticated.

While the above approach may provide some measure of enhanced security, one potential drawback is that the private key may be discoverable by external attack. That is, a third party may potentially be able to discover information about the private key by collecting and comparing messages from the sender. By knowing the private key, a third party may then be able to impersonate the sender and cause significant disruption to network operation, for example.

SUMMARY OF THE INVENTION

In view of the foregoing background, it is therefore an object of the present invention to provide enhanced security in a mobile ad-hoc network and related methods.

This and other objects, features, and advantages in accordance with the present invention are provided by a secure mobile ad-hoc network node which may include a wireless communications device for establishing a wireless communications link with at least one adjacent node, a plain text source, and a seed generator for performing a one-way algorithm using a secret key for generating a seed. Furthermore, a key encryptor may receive the seed and generate a key sequence based thereon, and a logic circuit may be included for generating cipher text for transmission to the at least one adjacent node over the wireless communications link and based upon the key sequence and the plain text.

More particularly, the one-way algorithm may be a hashing algorithm, such as a single-phase hashing algorithm, for example. The seed generator may perform the one-way algorithm using the secret key and a changing reference value to generate the seed. Also, the wireless communications device may have associated therewith a media access controller (MAC) layer, and the changing reference value may be a MAC layer sequence number, for example. Further, the seed generator may perform the one-way algorithm using the secret key and an address of the node. Additionally, the node may further include a random initialization vector (IV) generator for generating a random IV, and the seed generator may perform the one-way algorithm using the secret key and the random IV.

The use of the hashing algorithm makes the secret key much less susceptible to external attacks which compare intercepted network messages to isolate the common components (i.e., the secret key) therebetween. Moreover, use of the changing reference value makes attacks such as a decryption dictionary attack much less likely as it greatly increases the size of the dictionary required for such an attack.

In addition, the node may further include an integrity checker for generating an integrity check value based upon the plain text, and the logic circuit may generate the cipher text based upon the key sequence, the plain text, and the integrity check value. A concatenator may also be included for concatenating the plain text and the integrity check value, and the logic circuit may generate the cipher text based upon the key sequence and the concatenation of the plain text and the integrity check value. By way of example, the integrity checker may be a checksum generator.

Also, the logic circuit may be an exclusive OR logic circuit. A concatenator may also be included for concatenating the seed and the random IV, and the key encryptor may thus generate the key sequence based upon the concatenation of the seed and the random IV. In addition, the secret key may be a static secret key, and the key encryptor may be a pseudo-random number generator. Furthermore, the random IV generator may be coupled to the wireless communications device, and the wireless communications device may also transmit the random IV with the cipher text.

Another aspect of the invention relates to a mobile ad-hoc network which may include a plurality of nodes including a source node and at least one adjacent node. The source node may include a wireless communications device for establishing a wireless communications link with the at least one adjacent node, a plain text source, and a seed generator for performing a one-way algorithm using a secret key for generating a seed. Furthermore, the source node may also include a key encryptor for receiving the seed and generating a key sequence based thereon, and a logic circuit for generating cipher text for transmission over the wireless communications link and based upon the key sequence and the plain text.

A communications method aspect of the invention is for a mobile ad-hoc network and may include performing a one-way algorithm at a source node using a secret key to generate a seed, and generating a key sequence at the source node based upon the seed. The method may also include generating cipher text at the source node based upon the key sequence and the plain text, and transmitting the cipher text from the source node to at least one adjacent node.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
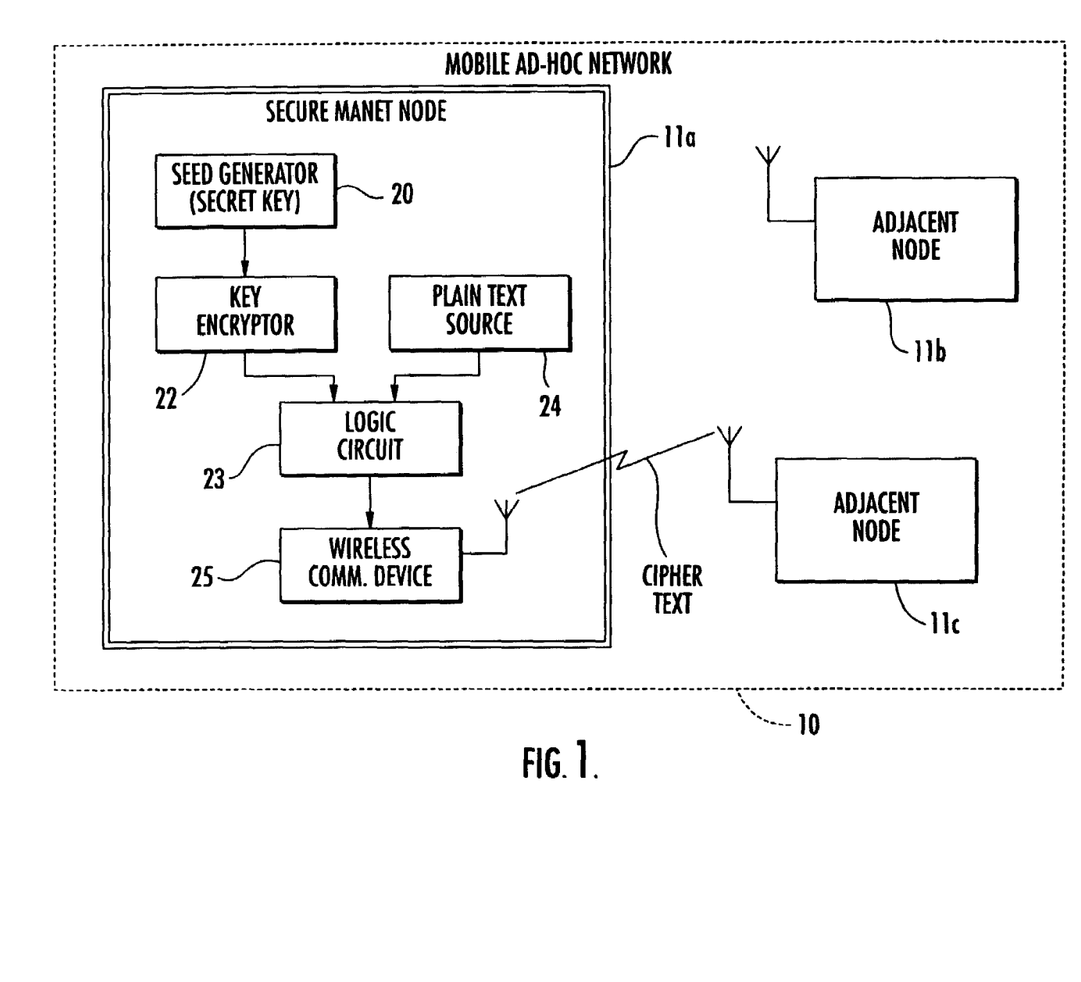
FIG. 1 is schematic block diagram of a mobile ad-hoc network in accordance with the present invention.

Referring initially to FIG. 1, a mobile ad-hoc network 10 in accordance with the present invention illustratively includes a plurality of wireless nodes 11a-11c. By way of example, the nodes 11 may be laptop computers, personal data assistants (PDAs), cellular telephones, or other suitable devices. Of course, in some embodiments one or more of the nodes 11a-11c may be fixed to provide a bridge to a wired (or satellite) communications infrastructure, such as a telephone network, for example.

In the illustrated example, the node 11a is functioning as a source node, and the nodes 11b, 11c are adjacent thereto in the network 10. While the secure data encryption and transmission components of the source node 11a will be described below, other nodes in the network 10 also preferably have such data encryption and transmission capabilities which are not shown for clarity of illustration. Moreover, while only three nodes 11a-11c are illustratively shown, any number of nodes may be included in the network 10, as will be appreciated by those of skill in the art.

The source node 11a illustratively includes a wireless communications device 25 for establishing a wireless communications link with at least one adjacent node (the node 11c in the illustrated example). The source node 11a further includes a plain text source 24 and a seed generator 20 for performing a one-way algorithm using a secret key for generating a seed. Furthermore, the source node 11a also includes a key encryptor 22 which receives the seed and generates a key sequence based thereon, and a logic circuit 23 which generates cipher text for transmission over the wireless communications link based upon the key sequence and the plain text.

The use of a one-way function is particularly advantageous in that it makes the secret key much more difficult to isolate by would-be hackers using attacks which compare multiple network messages. Such attacks have proven successful in the past for hacking secret keys in other types of networks, such a wireless local area networks (LANs), for example.

In particular, one of the more prominent standards which has been developed for regulating communications within wireless LANs/MANs is that of the Institute of Electrical and Electronic Engineers' 802 LAN/MAN Standards Committee, entitled "IEEE Standards for Information Technology—Telecommunications and Information Systems—Local and Metropolitan Area Network-Specific Requirements—Part 11: Wireless LAN Medium Access Control (MAC) and Physical Layer (PHY) Specifications," 1999, which is hereby incorporated herein in its entirety by reference. In addition to providing wireless communications protocols, the 802.11 standard also defines a wireless equivalent privacy (WEP) algorithm which is used to protect wireless signals from eavesdropping, as wireless signals are typically more vulnerable to being intercepted than signals sent on wired networks.

WEP relies on a secret key that is shared between wireless stations and an access point. The secret key is used to encrypt data packets prior to transmission, and an integrity check is used to ensure that packages are not modified during the transmission. Nonetheless, it has recently been discovered that the WEP algorithm is not as immune to external attacks as once believed. For example, in an article entitled "Intercepting mobile communications: The Insecurity of 802.11" by Borisov et al., MOBICOM, Rome, Italy, July 2001, the authors set forth a number of vulnerabilities in WEP. In particular, it was noted that a significant breach of security occurs when two messages are encrypted using a same initialization vector (IV) and secret key, as this can reveal information about both messages. More particularly, in accordance with WEP message ciphertext is generated using an exclusive OR operation. By exclusive O-ring ciphertext from two messages generated using the same IV, the key streams cancel out and it is then possible to recover the plain text. As such, this key stream re-use is susceptible to a decryption dictionary attack in which a number of messages are stored and compared to find multiple messages generated with a same IV.

Moreover, in a presentation by Fluhrer et al. entitled "Weaknesses in the Key Scheduling Algorithm of RC4" delivered in August of 2001 at the Eighth Annual Workshop on Selected Areas in Cryptography, several weaknesses in the key scheduling algorithm of WEP were outlined along with a proposed method for exploiting these weaknesses, commonly known as the "Fluhrer attack." Others have subsequently implemented the Fluhrer attack and established its viability. See, e.g., Stubblefield et al., "Using the Fluhrer, Mantin, and Shamir Attack to Break WEP," AT&T Labs Technical Report TD-4ZCPZZ, Aug. 6, 2001.

In accordance with the present invention, the one-way algorithm may be a hashing algorithm, for example, such as the MD5 or SHA-1 hashing algorithms, which are known to those of skill in the art. Of course, other suitable one-way algorithms known to those skilled in the art may also be used. Such algorithms are designed to make it extremely difficult to determine what is upstream from the hashing function (i.e., the components processed by the algorithm). Stated alternately, the use of such algorithms make it extremely unlikely that other components can be used to produce the same value output from the algorithm without access to the original input, including the secret key. Thus, by using a secret key encrypted with a one-way function to, in turn, encrypt plain text to be sent in wireless ad-hoc network messages, the secret key becomes much less vulnerable to attacks such as the Fluhrer attack.

In accordance with the above noted 802.11 standard, for example, when the WEP security function is enabled the encrypted messages include cipher text and an initialization vector (IV). The IV is normally used in WEP to augment the shared secret key used by the wireless stations and access points and produce a different key sequence for each packet of text, thus avoiding two cipher texts having the same key stream.

As noted above, even the use of the IV called for in the 802.11 standard does not make WEP immune to attacks such as the Fluhrer attack. The source node 11a of the present invention may include a random IV generator for causing similar variations in key sequences. Yet, in contrast to the approach set forth in the 802.11 standard for wireless LANs, in which the secret key is concatenated with the IV to generate a key seed, the seed generator 20 preferably performs the one-way algorithm using the secret key as well as one or both of a node address and a changing reference value for generating the seed.

By way of example, the secret key may be distributed to the nodes 11a-11c by various methods, such as by a wireless service provides, for example. The node address may similarly be assigned by a wireless service provider, for example, in accordance with the particular software and/or protocols being implemented for the mobile ad-hoc network 10.

While the node address need not be used in every embodiment, by its inclusion a third party who wishes to compare encrypted network messages to learn the secret key must necessarily compare messages only from the source node 11a. Thus, the added difficulty of collecting a sufficiently large number of encrypted messages from a single node may serve as a further deterrent to many would be hackers.

While mobile ad-hoc networks are still in their infancy and there is as yet no common standard governing communications in such networks, one likely characteristic of mobile ad-hoc networks is that mobile ad-hoc nodes will operate in accordance with the open system architecture (OSI) model. In the OSI model, communications protocols are implemented in seven layers, namely the application, presentation, session, transport, network, data link, and physical layers. The present invention may also advantageously operate in accordance with the OSI or other suitable frameworks, as well as implement various functions of the 802.11 wireless LAN standard and other similar protocols (e.g., Bluetooth), as will be appreciated by those of skill in the art. Moreover, the invention may also be implemented in any suitable mobile ad-hoc network routing protocol, such as those discussed above in the Background of the Invention.

Of the above OSI layers, the data link layer further includes a media access control (MAC) sub-layer. Moreover, the MAC layer typically has a sequence number associated therewith which is updated with each encrypted message that is sent. In accordance with the invention, the changing reference value may conveniently be the MAC layer sequence number, although other changing reference values may be generated or used for creating the key seed.

By way of example, the changing reference value may have a size greater than or equal to about 12 bits, which is the typical size of the MAC layer sequence number. By using a 12-bit changing reference value, for example, other types of message comparison attacks, such as a decryption dictionary attack, would have to be 4096 times as large as with the standard WEP protocol to be successful, as will be appreciated by those of skill in the art. As such, this type of attack is essentially unfeasible in accordance with the present invention.

Figure 2:
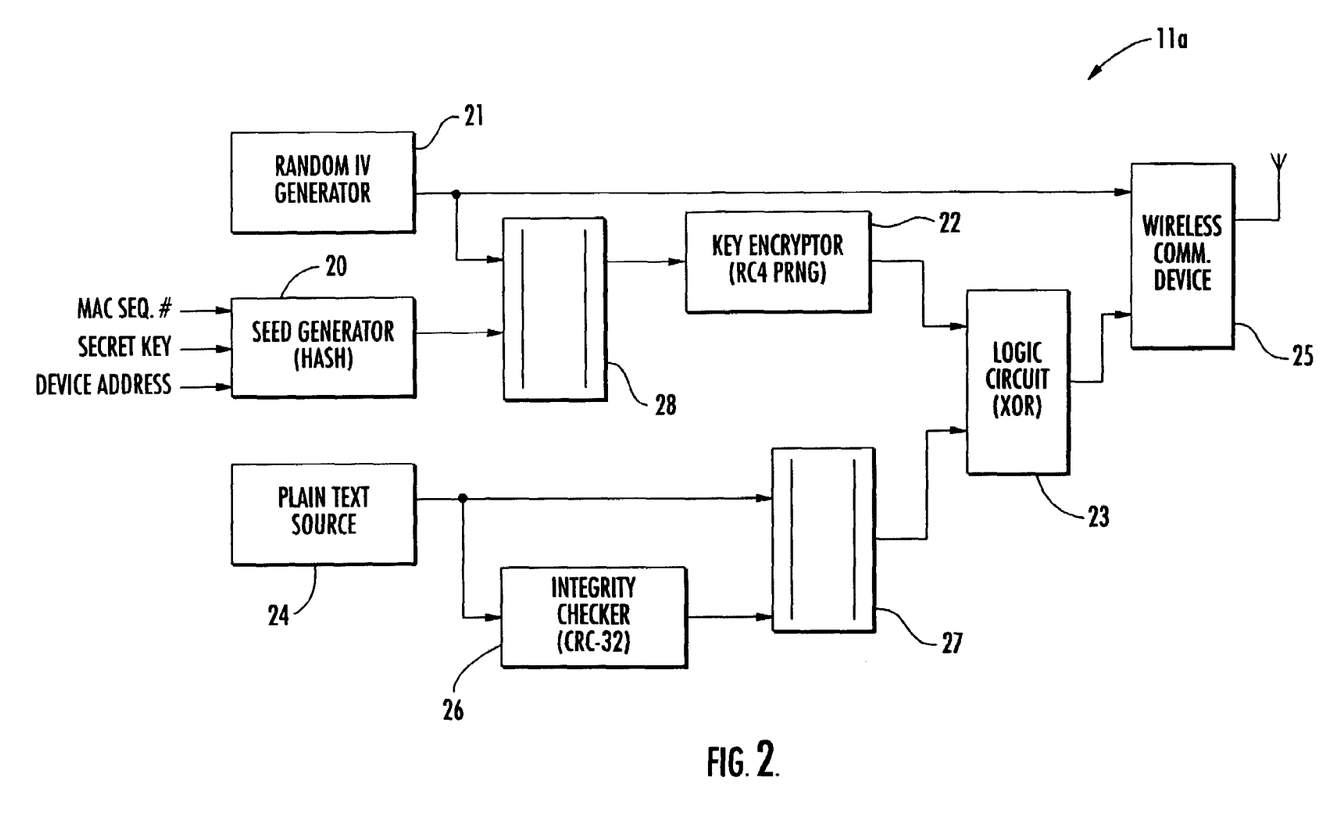
FIG. 2 is a more detailed schematic block diagram of the source node of the mobile ad-hoc network of FIG. 1.

Turning to the more detailed schematic block diagram of the source node 11a illustrated in FIG. 2, the source node 11a illustratively includes a random IV generator 21 for generating a random IV, and the key encryptor 22 generates the key sequence based upon the seed and the random IV. Of course, those of skill in the art will appreciate that other types of IV generators may also be used in some embodiments, such as counters or value-flipping (i.e., switching between two or more IV values) devices, for example. However, random IV generation will require that a maximum size dictionary be used to perform a successful decryption dictionary attack, and may therefore be preferable in many embodiments.

By way of example, the key encryptor 22 may implement the RC4 pseudo-random number generation algorithm specified in the 802.11 standard, although other suitable random number or key sequence generating algorithms may be used in some embodiments. In the case of RC4, the first 256 bytes (or other numbers of bytes) of the RC4 keystream could be discarded as further security against Fluhrer attacks, for example, as will be appreciated by those of skill in the art.

The logic circuit 23 generates cipher text based upon the key sequence and plain text from the plain text source 24. The plain text source may generate plain text at the source node 11a, for example, or it may simply be an input for receiving text from another node to be passed along. The logic circuit 23 is illustratively shown as an exclusive OR logic circuit in FIG. 2, but other suitable logic circuits known to those of skill in the art may also be used.

The wireless communications device 25 is connected to the logic circuit 23 and the random IV generator 21 for wirelessly transmitting the encrypted message, which here includes the cipher text and random IV, as illustratively shown. Even so, the random IV need not be used in every embodiment, as will be appreciated by those skilled in the art. The wireless communications device may be any suitable wireless transceiver device, such as devices that operate according to the 802.11 or Bluetooth wireless LAN protocols, for example.

The wireless station 11a also illustratively includes an integrity checker 26 for generating an integrity check value or field based upon the plain text to be placed in the cipher text. The integrity check field may advantageously be used during message decryption to ensure the integrity of the message received from the source node 11a. By way of example, the integrity check field may be implemented as a CRC-32 checksum value, as is used in accordance with the 802.11 standard, but other suitable integrity check values known to those of skill in the art may also be used.

Moreover, the source node 11a further illustratively includes a concatenator 27 for concatenating the plain text and the integrity check value, and the logic circuit 23 may generate the cipher text based upon the key sequence and the concatenation of the plain text and the integrity check value. Similarly, a concatenator 28 is also included for concatenating the seed and the random IV, and the key encryptor 22 thus generates the key sequence based upon the concatenation of the seed and the random IV.

In accordance with the 802.11 standard, the IV has a size of 24 bits. Yet, in accordance with the present invention, the random IV preferably has a size of greater than about 24 bits (e.g., 48 bits), which may provide yet further protection against a decryption dictionary attack, for example. Of course, even larger sizes of IVs may also be used to reduce the possibility of even a single collision of IV's when IV's are generated randomly, as will be appreciated by those of skill in the art.

One particular advantage of the above approach is that it does not require the continuous generation and/or distribution of temporary or session keys to different nodes in the mobile ad-hoc network 10. Rather, the secret key may be a "static" secret key that need not be frequently changed to ensure enhanced security. Of course, the secret key may be periodically (e.g., daily, monthly, etc.) changed in some embodiments, if even further security enhancements are desired, as will be appreciated by those of skill in the art.

Figure 3:
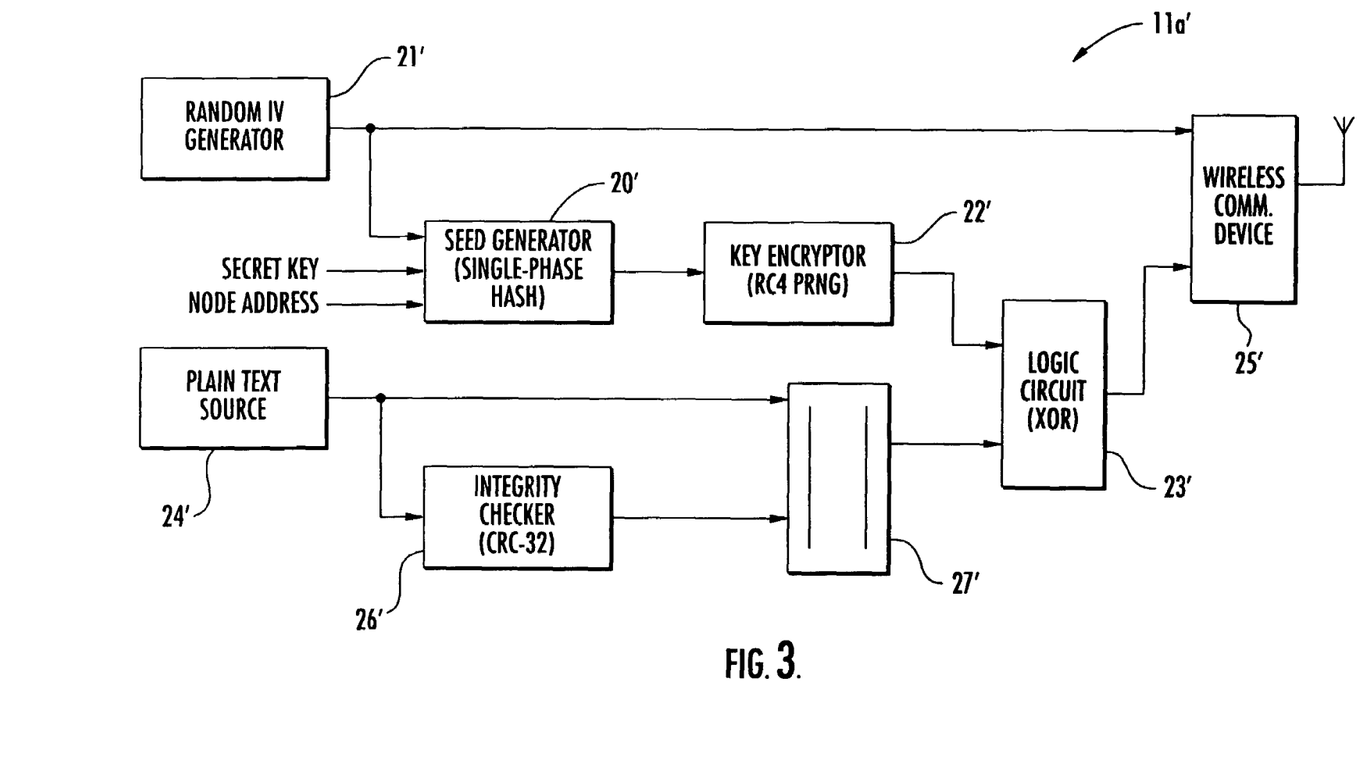
FIG. 3 is a more detailed schematic block diagram of an alternate embodiment of the source node of the mobile ad-hoc network of FIG. 1.

An alternate embodiment of the source node 11a' is illustrated in FIG. 3. In this embodiment, the seed generator 20' performs a single-phase, one-way algorithm (e.g., a hashing algorithm) using the secret key, the node address, and the random IV (as opposed to the changing reference value, as described above) to generate the seed. Of course, various combinations of the random IV, node address, and/or changing reference value (as well as others) may be used in different embodiments. By using an extended IV (e.g., 48 bits) as noted above, the use of a decryption dictionary attack to discover the secret key would be extremely impractical, as will be appreciated by those of skill in the art. The remaining elements not specifically discussed in FIG. 3 are similar to those noted above and will therefore not be discussed further herein.

Figure 4:
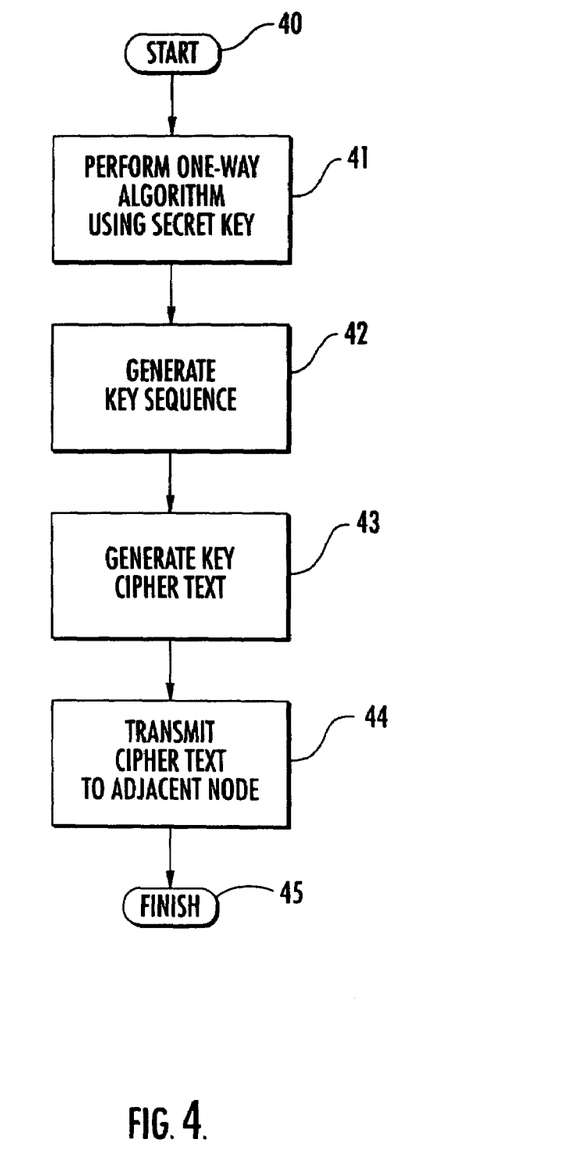
FIG. 4 is a flow diagram illustrating a method in accordance with the present invention.

A communications method aspect of the invention will now be described with reference to FIG. 4. The method begins (Block 40) by performing a one-way algorithm at the source node 11a using a secret key to generate a seed, at Block 41. Further, the key sequence is generated at the source node 11a based upon the seed, at Block 42, as previously described above. The method may also include generating cipher text at the source node 11a based upon the key sequence and the plain text, at Block 43, and transmitting the cipher text from the source node 11a to the at least one adjacent node 11c, at Block 44, as also described above, thus concluding the method (Block 45). Additional method aspects will be apparent to those of skill in the art from the above description and will therefore not be discussed further herein.

Additional features of the invention may be found in the co-pending application entitled SECURE WIRELESS LOCAL OR METROPOLITAN AREA NETWORK AND RELATED METHODS, attorney docket no. GCSD-1239 (51286), the entire disclosure of which is hereby incorporated herein by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A secure mobile ad-hoc network (MANET) node comprising:
    a wireless communications device for establishing a wireless communications link with at least one adjacent MANET node in a MANET to establish at least one route to a destination MANET node based upon a MANET routing protocol to thereby transfer cipher text to the destination MANET node;
    a plain text source;
    a random initialization vector (IV) generator for generating a random IV;
    a seed generator for performing a one-way algorithm using a secret key and the random IV for generating a seed;
    a key encryptor receiving the seed and generating a key sequence based thereon; and
    a logic circuit generating the cipher text for transmission to the at least one adjacent MANET node over the wireless communications link and based upon the key sequence and the plain text;
    said random IV generator being coupled to said wireless communications device, and said wireless communications device transmitting the random IV with the cipher text.

2. The node of claim 1 wherein the one-way algorithm comprises a hashing algorithm.

3. The node of claim 2 wherein the hashing algorithm comprises a single-phase hashing algorithm.

4. The node of claim 1 wherein said seed generator performs the one-way algorithm using the secret key and a changing reference value to generate the seed.

5. The node of claim 4 wherein the wireless communications device has associated therewith a media access controller (MAC) layer; and wherein the changing reference value comprises a MAC layer sequence number.

6. The node of claim 1 wherein said seed generator performs the one-way algorithm using the secret key and an address of the node.

7. The node of claim 1 further comprising an integrity checker for generating an integrity check value based upon the plain text; and wherein said logic circuit generates the cipher text based upon the key sequence, the plain text, and the integrity check value.

8. The node of claim 7 further comprising a concatenator for concatenating the plain text and the integrity check value; and wherein said logic circuit generates the cipher text based upon the key sequence and the concatenation of the plain text and the integrity check value.

9. The node of claim 7 wherein said integrity checker comprises a checksum generator.

10. The node of claim 1 wherein said logic circuit comprises an exclusive OR logic circuit.

11. The node of claim 1 further comprising a random initialization vector (IV) generator for generating a random IV, and a concatenator for concatenating the seed and the random IV; and wherein said key encryptor generates the key sequence based upon the concatenation of the seed and the random IV.

12. The node of claim 1 wherein the secret key comprises a static secret key.

13. The node of claim 1 wherein said key encryptor comprises a pseudo-random number generator.

14. The device of claim 1 wherein the key sequence comprises a plurality of bytes; and wherein said key encryptor deletes at least one byte from the key sequence prior to generation of the cipher text by said logic circuit.

15. A secure mobile ad-hoc network (MANET) node comprising:
a wireless communications device for establishing a wireless communications link with at least one adjacent MANET node in a MANET to establish at least one route to a destination MANET node based upon a MANET routing protocol and to thereby transfer cipher text to the destination MANET node;
a plain text source;
a seed generator for performing a hashing algorithm using a secret key and a changing reference value for generating a seed;
a random initialization vector (IV) generator for generating a random IV;
a key encryptor receiving the seed and the random IV and generating a key sequence based thereon; and
a logic circuit generating the cipher text for transmission to the at least one adjacent MANET node over the wireless communications link and based upon the key sequence and the plain text.

16. The node of claim 15 wherein the wireless communications device has associated therewith a media access controller (MAC) layer; and wherein the changing reference value comprises a MAC layer sequence number.

17. The node of claim 15 wherein said seed generator performs the hashing algorithm using the secret key, the changing reference value, and an address of the node.

18. The node of claim 15 further comprising an integrity checker for generating an integrity check value based upon the plain text; and wherein said logic circuit generates the cipher text based upon the key sequence, the plain text, and the integrity check value.

19. The node of claim 18 wherein said integrity checker comprises a checksum generator.

20. The node of claim 15 further comprising a concatenator for concatenating the seed and the random IV; and wherein said key encryptor generates the key sequence based upon the concatenation of the seed and the random IV.

21. The node of claim 15 wherein said key encryptor comprises a pseudo-random number generator.

22. The node of claim 15 wherein said seed generator performs a single-phase hashing algorithm.

23. A secure mobile ad-hoc network (MANET) node comprising:
a wireless communications device for establishing a wireless communications link with at least one adjacent MANET node in a MANET to establish at least one route to a destination MANET node based upon a MANET routing protocol and to thereby transfer cipher text to the destination MANET node;
a plain text source;
a random initialization vector (IV) generator for generating a random IV;
a seed generator for performing a hashing algorithm using a secret key and the random IV for generating a seed;
a key encryptor generating a key sequence based upon the seed; and
a logic circuit generating the cipher text for transmission to the at least one adjacent MANET node over the wireless communications link and based upon the key sequence and the plain text.

24. The node of claim 23 wherein said seed generator performs the hashing algorithm using the secret key, the random IV, and an address of the node.

25. The node of claim 23 further comprising an integrity checker for generating an integrity check value based upon the plain text; and wherein said logic circuit generates the cipher text based upon the key sequence, the plain text, and the integrity check value.

26. The node of claim 25 wherein said integrity checker comprises a checksum generator.

27. The node of claim 23 wherein said key encryptor comprises a pseudo-random number generator.

28. The node of claim 23 wherein said seed generator performs a single-phase hashing algorithm.

29. A mobile ad-hoc network (MANET) comprising:
a plurality of MANET nodes comprising a source MANET node, at least one MANET node adjacent to said source MANET node, and a destination MANET node, said source MANET node comprising
a wireless communications device for establishing a wireless communications link with said at least one adjacent MANET node to establish at least one route to the destination MANET node based upon a MANET routing protocol and to thereby transfer cipher text to the destination MANET node,
a plain text source,
a random initialization vector (IV) generator for generating a random IV;
a seed generator for performing a one-way algorithm using a secret key and the random IV for generating a seed,
a key encryptor receiving the seed and generating a key sequence based thereon, and
a logic circuit generating the cipher text for transmission to the at least one adjacent MANET node over the wireless communications link and based upon the key sequence and the plain text.

30. The mobile ad-hoc network of claim 29 wherein the one-way algorithm comprises a hashing algorithm.

31. The mobile ad-hoc network of claim 29 wherein said seed generator performs the one-way algorithm using the secret key and a changing reference value to generate the seed.

32. The node of claim 31 wherein the wireless communications device has associated therewith a media access controller (MAC) layer; and wherein the changing reference value comprises a MAC layer sequence number.

33. The node of claim 29 wherein said seed generator performs the one-way algorithm using the secret key and an address of the node.

34. The node of claim 29 wherein said random IV generator is coupled to said wireless communications device, and wherein said wireless communications device also transmits the random IV with the cipher text.

35. A communications method for a mobile ad-hoc network (MANET) comprising a plurality of MANET nodes, the method comprising:
- establishing a route from a source MANET node to a destination MANET node in the MANET based upon a MANET routing protocol;
- generating a random initialization vector (IV) at the source MANET node;
- performing a one-way algorithm at the source MANET node using a secret key and the random IV to generate a seed;
- generating a key sequence at the source MANET node based upon the seed;
- generating cipher text at the source MANET node based upon the key sequence and the plain text; and
- transmitting the cipher text from the source MANET node to at least one adjacent MANET node along the route to the destination MANET node.

36. The method of claim 35 wherein performing the one-way algorithm comprises performing a hashing algorithm.

37. The method of claim 35 wherein performing the one-way algorithm comprises performing the one-way algorithm using the secret key and a changing reference value.

38. The method of claim 37 wherein the changing reference value comprises a MAC layer sequence number.

39. The method of claim 35 wherein performing the one-way algorithm comprises performing the one-way algorithm using the secret key and an address of the node.

40. The method of claim 35 further comprising generating an integrity check value at the source node based upon the plain text.

41. The method of claim 40 wherein generating the cipher text comprises generating the cipher text based upon the key sequence, the plain text, and the integrity check value.

42. The method of claim 35 further comprising generating a random initialization vector (IV) and concatenating the seed and the random IV at the source node; and
- wherein generating the key sequence comprises generating the key sequence based upon the concatenation of the seed and the random IV.

* * * * *